United States Patent [19]

Shibata

[11] 4,152,186
[45] May 1, 1979

[54] PROCESS FOR MAKING A RADIAL TIRE
[75] Inventor: Narajiro Shibata, Iwanuma, Japan
[73] Assignee: The Toyo Rubber Industry Co., Ltd., Osaka, Japan
[21] Appl. No.: 837,354
[22] Filed: Sep. 27, 1977
[30] Foreign Application Priority Data
  Sep. 27, 1976 [JP] Japan ................................ 51/116130
[51] Int. Cl.² ...................... B29H 17/14; B29H 17/26
[52] U.S. Cl. ............................ 156/123 R; 152/353 R; 152/354 R; 152/357 R; 152/374; 156/128 R
[58] Field of Search ............... 156/123 R, 124, 110 R, 156/124, 128 R, 128 T, 133; 152/330 R, 353 R, 354 R, 355, 357 R, 360, 361 R, 374

[56] References Cited
U.S. PATENT DOCUMENTS

| | | | |
|---|---|---|---|
| 1,769,694 | 7/1930 | Jenkinson | 152/374 |
| 2,445,725 | 7/1948 | Walker | 152/374 |
| 2,501,493 | 3/1950 | Beward | 152/374 |
| 2,675,854 | 4/1954 | Engler | 156/122 |
| 3,170,499 | 2/1965 | Deist | 152/374 |
| 3,509,929 | 5/1970 | Delobelle | 152/360 |
| 4,006,766 | 2/1977 | Takayanagi et al. | 152/374 X |

Primary Examiner—John E. Kittle
Attorney, Agent, or Firm—Wenderoth, Lind & Ponack

[57] ABSTRACT

Process for making a radial tire wherein a breaker ply layer and a tread layer are successively secured on the upper part of a first step assembly. The first step assembly consists of a carcass ply layer, bead portions and side wall rubbers. The tread layer is a composite form having a tread rubber, a pair of joint rubbers and a cushion rubber. Uneven surfaces are formed circumferentially containing therein the joint portions joint of the Joint rubbers and the side wall rubbers.

5 Claims, 4 Drawing Figures

PROCESS FOR MAKING A RADIAL TIRE

SUMMARY OF THE INVENTION

This invention relates to a process for making a radial tire. As is well known, a radial tire has a carcass ply layer consisting of rubber coated cords radially disposed at angles 70° to 90° to the equatorial direction of the tire and a breaker ply layer mounted thereon. The angles of the cords being nearly in the circumferential direction.

DESCRIPTION OF THE PRIOR ART

Because of such structure, it is difficult to make a radial tire in one step wherein all members are secured each other on a horizontal cylindrical form as in the case of a bias tire. Accordingly, a two step formation has been employed which comprises forming a first step assembly consisting of bead portions, a carcass portion and side wall rubber portions, forming the first step assembly into a toroidal shape and thereafter forming a breaker ply layer and a tread layer successively on the carcass ply layer.

In relation to their functions, the tread layer requires abrasion resistance and the side wall rubbers require flexing resistance. Accordingly, on the shoulder surfaces, which are easily affected by repeated stress caused by running of the tire, there appear joint portions of rubbers having different qualities, which are poor in mutual adhesion. It is one of the disadvantages of a conventional tire that the joint portions will relatively easily separate from one another.

To improve this disadvantage, for example, in the U.S. Pat. No. 4,007,069, there is disclosed a process for making a radial tire which comprises forming a tread layer as a composite form consisting of a tread rubber having abrasion resistance and side margin rubbers integrally formed at both side portions of said tread rubber by rubber materials having high flexibility as with the side wall rubbers, and securing the edge portions of said side margin rubbers to overlap with the adjacent edges of the side wall rubbers. This process slightly improved the joint condition compared with that obtained with rubbers of different qualities. However, it was not fully satisfactory in the durability, because the joint portions were subjected to repeated stress under various running conditions, such as seasonal temperature changes wet surfaces, etc. Further, it had an uncertain factor in that the bonding force depended upon the quality of workmanship of securing the side margin rubbers to the side wall rubbers.

Accordingly, it is an object of this invention to provide a process for making a radial tire wherein the adhesive property between the tread layer and side wall rubbers is excellent and the joint portions will never separate each other.

A further object is to provide a process wherein stable joint conditions can be achieved without depending upon quality of workmanship.

Other objects and features of this invention will be clear from the following description to be made in connection with the attached figures.

BRIEF DISCUSSION OF THE DRAWINGS

Figure 3:

FIGS. 3 (a), (b) and (c) are sectional diagrams of the uneven surfaces formed in the area of the joint portions between the tread layer and the side wall rubbers.

Figure 4:
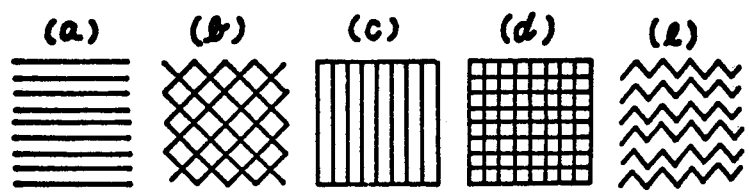

FIGS. 4 (a), (b), (c), (d) and (e) are schematic plan views showing various designs of said uneven surfaces.

DETAILED DESCRIPTION OF THE INVENTION

Figure 1:
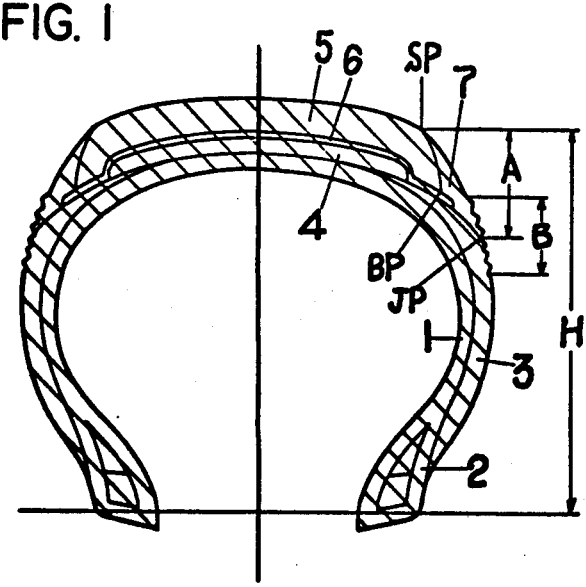
FIG. 1 is a sectional view taken along the axial direction of a radial tire made in accordance with this invention.
Figure 2:
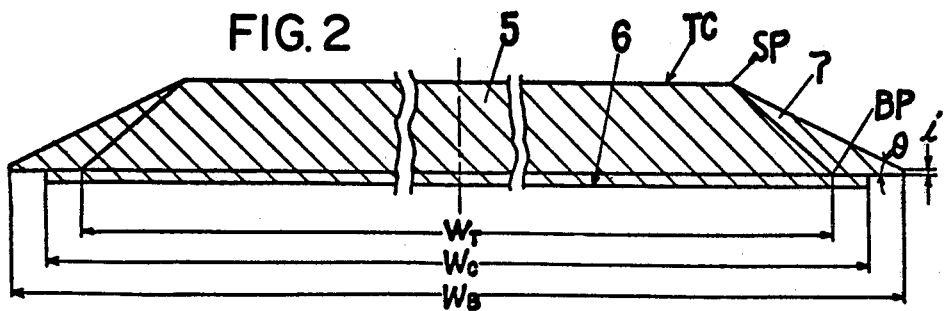
FIG. 2 is an enlarged sectional view of the tread layer to be secured onto the breaker ply layer, longitudinal size being omitted.

Referring to FIG. 1, numeral 1 indicates a carcass ply layer consisting of rubber coated cords radially disposed at a 70° to 90° angle to the equatorial direction of the tire. A first step assembly is formed by securing the carcass ply layer 1, bead portions 2 formed by adhering each member properly selected frm bead wire, flipper, rubber filler, chafer or other reinforcing materials and side wall rubbers 3. At the second step, this first step assembly is radially expanded and formed into a toroidal shape similar to the tire shape and subsequently a breaker ply layer 4 consisting of rubber coated cords is secured onto the carcass ply layer 1 and further a tread layer is secured thereon. The tread layer in this invention, as clearly shown in FIG. 2, is formed as a composite form of a tread rubber 5, joint rubbers 7 and cushion rubber 6 which are integrally formed while in a hot condition. The tread layer of composite form is so arranged to cover and adhere to the upper portion and side portion of the breaker ply layer 4 and is jointed with the side wall rubbers 3. The width Wc of the cushion rubber is arranged at $Wt < Wc < Wb$ in its relation with the width Wt of the lower surface of the tread rubber 5 and the distance Wb between lower opposite ends of the joint rubbers 7. Accordingly, the cushion rubber 6 is integrally secured to cover the joint portions Bp between the tread rubber 5 and the joint rubbers 7. The adhesive force of the joint portions Bp is reinforced to prevent the occurrence of inside separation. Further, in this invention, 300% modulus value after vulcanizing of the joint rubbers 7 is situated between the 300% modulus values of the tread rubber 5 and the side wall rubbers 3. Accordingly, the joint rubbers 7 will retain an intermediate property between those of the tread rubber 5 and the side wall rubbers 3 and exhibit good adhesive properties. The joint rubbers 7 are formed to make their extremities as sharp as possible so as to be easily situated on the surface of the side wall rubbers 3 in close relation thereto and also to be free from the concentration of stress during the running of a tire produced after vulcanization. Thus, the separation which can occur at the joint portions Jp between the joint rubbers 7 and side wall rubbers 3 is effectively prevented. Considering the transfer of the joint rubbers to the breaker ply layer after being integrally formed with the tread rubber and cushion rubbers and also the stability of the joint conditions when subjected to repeated stresses, it is preferable to arrange the angle $\theta$ of the extremity of the joint rubbers to between 10° to 30° and to arrange the width (i) thereof to approximately $i \leq 1.5$ mm. Considering the stress distribution, under the running condition of a tire, the joint portions Jp between the joint rubbers 7 and the side wall rubbers 3 are so arranged as to have an A/H value within 20% to 40%, wherein A is the distance from the shoulder points Sp to the joint portions Jp between the joint rubbers 7 and side wall rubbers 3 and H is the height of the shoulder points Sp from the bead heals.

In FIG. 1, the 300% modulus values after vulcanization of the tread rubber 5, the joint rubber 7, the cushion rubber 6 and the side wall rubbers 3, are 70 to 130 kg/cm², 60 to 100 kg/cm²; 80 to 120 kg/cm² and 40 to 80 kg/cm², respectively.

In this invention, it is one of the features that uneven surfaces are formed through the whole circumference of the tire with the width B covering the upper and lower areas of the joint portions Jp in order to further reinforce the joint condition of the joint portions Jp. That is, the uneven surfaces are formed during the vulcanization by using a vulcanizing mold having uneven surfaces engraved on its internal walls corresponding to the width B extending from the upper parts to the lower parts of the joint portions Jp.

The tread layer of the composite form can be easily formed in a hot condition, but it is difficult to conduct the heat-jointing at the joint portions Jp between the joint rubbers 7 and side wall rubbers 3. Further, satisfactory adhesion will not be always obtained, because the joint conditions vary depending upon the technical skill of the operator. In accordance with this invention, however, when uneven surfaces are engraved in the vulcanizing mold so as to form corresponding uneven surfaces having the width of the joint portions Jp at the time of vulcanization, there takes place a complex flowing, conducted by the uneven surfaces, of molecules of rubbers to be jointed with each other. In addition to the above flowing, the viscosity of the rubber materials under heat at vulcanization will serve for the good mutual dispersion of the molecules of the rubbers. Accordingly strong adhesion is established through the particular joint conditions obtained by the mutual dispersion and penetration through each other, which is not expected in the surface flowing of conventional joint conditions. In addition, since said joint conditions are obtained during vulcanization molding in the mold, a stable adhesive effect is obtained without dependance upon the operator's skill.

Concerning the width of the uneven surfaces, the above purposes and effects are fully achieved with the uneven surfaces having a width of 3 to 15 mm at the upper and lower parts respectively from the joint portions Jp, i.e. having an entire width of about 6 to 30 mm. Further, it may be made wider for decorative or other purposes.

As shown in FIG. 3, various shapes, such as, trapezoidal, tri-angular, semi-circular shapes, etc. can be employed as part of the uneven surfaces, and the plan configuration may be also of various shapes, such as, longitudinal, lateral, diagonal or a combination thereof, as schematically shown in FIG. 4. Briefly speaking, any shape may be employed as far as the complicated flowing of rubber molecules is obtained wherein the molecules of both rubbers penetrate complexly into each other.

Next, the main components of each member of a tire and the physical properties thereof will be described below as embodying this invention.

DESCRIPTION OF THE PREFERRED EMBODIMENTS

Tread rubber 5 has a main composition composed of 100 parts by weight of blended rubber consisting of one kind or two or more kinds of natural rubber (NR), synthetic isoprene rubber (IR), styrene-butadience rubber (SBR) or butadiene rubber (BR) and 60 to 90 parts of furnace black having not more than 30 mμ particle size and its 300% modulus value after vulcanization being 70 to 130 kg/cm².

Joint rubbers 7 have the main composition composed of 100 parts by weight of blended rubber consisting of 40 to 80 parts of NR and IR and 60 to 20 parts of BR or SBR, 40 to 70 parts of furnace black (25 to 60 mμ particle size), 10 to 30 parts of process oil, 1 to 10 parts of higher fatty acid zinc ester, 5 to 30 parts of a siliceous reinforcing agent and 1 to 5 parts of an antioxidant 300% modulus value after vulcanization is 60 to 100 kg/cm².

Cushion rubber 6 has a main composition composed of 100 parts by weight of blended rubber consisting of 40 to 80 parts of NR or IR and 60 to 20 parts of SBR or BR, 30 to 50 parts of furnace black (25 to 60 mμ particle size), 10 to 30 parts of process oil. 1 to 5 parts of tackifier and the Mooney viscosity is 50 to 70 ($ML_{1+4}$) and the modulus value after vulcanization being 80 to 120 kg/cm².

Side wall rubbers 3 have a main composition composed of 100 parts by weight of blended rubber consisting of 40 to 80 parts of NR and IR and 60 to 20 parts of SBR or BR, 40 to 70 parts of furnace black (25 to 60 mμ particle size), 10 to 30 parts of process oil, 1 to 5 parts of an antioxidant and 1 to 10 parts of paraffin or microcrystalline wax. The 300% modulus value after vulcanization is 40 to 80 kg/cm².

The siliceaus reinforcing agent and higher fatty acid zinc ester used in the joint rubbers 7 is to maintain the sharp extremity shapes after extrusion molding and to improve their adhesion to the side wall rubbers.

What is claimed is:

1. A process for making a radial tire comprising forming a first step assembly by securing a carcass ply layer having cords radially disposed at 70° to 90° to the equatorial direction of the tire, bead portions and side wall rubbers to each other, forming the first step assembly into a toroidal shape, securing a breaker ply layer to an upper portion of the cascass ply layer, securing a tread layer to the first step assembly covering upper and side portions of the breaker ply layer, and being subjected to vulcanization, wherein said tread layer being is a composite form, integrally pre-formed in a hot condition, consisting of a tread rubber and a pair of joint rubbers with acute ends formed at the both side portions of the tread rubber and a cushion rubber formed at the under portion of said composite form, said joint rubbers having a 300% modulus value after vulcanization situating between the 300% modulus values after vulcanization of the tread rubber and the side wall rubbers, the width Wc of the cushion rubber being arranged at Wt<Wc<Wb with relation to the width Wt of the tread rubber and the width Wb taken from one end to another of the joint rubbers so that joint portions Bp of the tread rubber and the joint rubbers are covered by the cushion rubber, the composite form of tread layer being secured onto the breaker ply layer and the side wall rubber, and being subjected to vulcanization, while simultaneously forming circumferentially uneven surfaces having a width containing therein the joint portions Jp of the joint rubbers and side wall rubbers by using a vulcanizing mold having corresponding uneven surfaces.

2. A process according to claim 1, wherein 300% modulus values after vulcanization are as follows; tread rubber 70 to 130 kg/cm², joint rubbers 60 to 100 kg/cm², cushion rubber 80 to 120 kg/cm² and side wall rubber 40 to 80 kg/cm².

3. A process according to claim 1, wherein the angle θ of the end portions of the joint rubbers is 10° to 30°.

4. A process according to claim 1, wherein the width B of the uneven surfaces is about 6 to 30 mm.

5. A process according to claim 1, wherein the joint portions Jp are taken at a ratio of 20 to 40% of A/H, wherein A is the distance from the shoulder point Sp to the joint portion Jp and H is the height of the shoulder point Sp from the bead heal.

* * * * *